(12) United States Patent
Reavis et al.

(10) Patent No.: US 7,404,438 B2
(45) Date of Patent: Jul. 29, 2008

(54) SOLID EXPANDABLE TUBULAR MEMBERS FORMED FROM VERY LOW CARBON STEEL AND METHOD

(75) Inventors: Gary M. Reavis, White Oak, TX (US); Bluford W. Lowery, Linden, TX (US); Ralph R. Myers, Naples, TX (US); Bowman A. Urech, Plano, TX (US)

(73) Assignee: United States Steel Corporation, Pittsburgh, PA (US)

( * ) Notice: Subject to any disclaimer, the term of this patent is extended or adjusted under 35 U.S.C. 154(b) by 0 days.

(21) Appl. No.: 11/567,501

(22) Filed: Dec. 6, 2006

(65) Prior Publication Data

US 2007/0107895 A1    May 17, 2007

Related U.S. Application Data

(62) Division of application No. 10/440,065, filed on May 16, 2003, now Pat. No. 7,169,239.

(51) Int. Cl.
    *E21B 17/00* (2006.01)
(52) U.S. Cl. .................... 166/242.1; 166/207
(58) Field of Classification Search ............. 166/242.1, 166/207, 242.6
    See application file for complete search history.

(56) References Cited

U.S. PATENT DOCUMENTS

| | | | |
|---|---|---|---|
| 1,764,769 A | 6/1930 | Woods | |
| 2,122,757 A | 7/1938 | Scott | 285/146 |
| 2,211,173 A | 8/1940 | Shaffer | 285/146 |
| 2,812,025 A | 11/1957 | Teague et al. | 166/207 |
| 3,397,745 A | 8/1968 | Owens et al. | 166/57 |
| 3,463,228 A | 8/1969 | Hearn | 166/181 |
| 3,489,437 A | 1/1970 | Duret | 285/55 |
| 3,508,771 A | 4/1970 | Duret | 285/334 |
| 3,572,777 A | 3/1971 | Blose et al. | 285/334 |
| 3,574,357 A | 4/1971 | Tirgoviste et al. | 285/47 |
| 3,581,817 A | 6/1971 | Kammerer, Jr. | 166/208 |
| 3,645,628 A | 2/1972 | Bojic et al. | 356/86 |
| 3,678,727 A | 7/1972 | Jackson | 72/367 |
| 3,826,124 A | 7/1974 | Baksay | 72/367 |
| 3,830,294 A | 8/1974 | Swanson, Jr. | 166/51 |
| 3,830,295 A | 8/1974 | Crowe | 166/125 |
| 3,874,446 A | 4/1975 | Crowe | 166/129 |

(Continued)

FOREIGN PATENT DOCUMENTS

DE    31 39 62 2 A1    4/1983

(Continued)

OTHER PUBLICATIONS

Tenaris "Case Study: Special Testing and Reeling Test" www.tenaris.com (1 page).

(Continued)

*Primary Examiner*—Hoang Dang
(74) *Attorney, Agent, or Firm*—Baker Botts L.L.P.

(57) ABSTRACT

A very low carbon steel alloy is provided for use in manufacturing tubular members such as oil country tubular goods. The tubular members may be radially expanded from at least twenty percent to forty percent. Sections or joints of casing formed from the steel alloy may be installed within a wellbore and radially expanded during completion of the wellbore.

10 Claims, 3 Drawing Sheets

U.S. PATENT DOCUMENTS

| | | | | |
|---|---|---|---|---|
| 3,915,763 | A | 10/1975 | Jennings et al. | 148/127 |
| 3,963,076 | A | 6/1976 | Winslow | 166/278 |
| 3,964,938 | A | 6/1976 | Tolliver et al. | 148/12 B |
| 4,018,634 | A | 4/1977 | Fencl | 148/131 |
| 4,282,047 | A | 8/1981 | Yamagata et al. | 148/143 |
| 4,397,484 | A | 8/1983 | Miller | 285/81 |
| 4,458,925 | A | 7/1984 | Raulins et al. | 285/332.2 |
| 4,468,309 | A | 8/1984 | White | 204/192 |
| 4,483,399 | A | 11/1984 | Colgate | 166/308 |
| 4,495,073 | A | 1/1985 | Beimgraben | 210/448 |
| 4,506,432 | A | 3/1985 | Smith | 29/458 |
| 4,508,167 | A | 4/1985 | Weinberg et al. | 166/120 |
| 4,513,995 | A | 4/1985 | Niehaus et al. | 285/55 |
| 4,527,815 | A | 7/1985 | Frick | 285/55 |
| 4,531,552 | A | 7/1985 | Kim | 138/149 |
| 4,533,405 | A | 8/1985 | Sponseller et al. | 148/36 |
| 4,537,429 | A | 8/1985 | Landriault | 285/334 |
| 4,538,442 | A | 9/1985 | Reed | 72/367 |
| 4,538,840 | A | 9/1985 | DeLange | 285/333 |
| 4,544,422 | A | 10/1985 | Rao | 148/142 |
| 4,550,937 | A | 11/1985 | Duret | 285/334 |
| 4,582,348 | A | 4/1986 | Dearden et al. | 285/175 |
| 4,596,913 | A | 6/1986 | Takechi et al. | 219/8.5 |
| 4,603,889 | A | 8/1986 | Welsh | 285/175 |
| 4,629,224 | A | 12/1986 | Landriault | 285/334 |
| 4,630,849 | A | 12/1986 | Fukui et al. | 285/55 |
| 4,676,563 | A | 6/1987 | Curlett et al. | 439/194 |
| 4,732,416 | A | 3/1988 | Dearden et al. | 285/333 |
| 4,758,025 | A | 7/1988 | Frick | 285/55 |
| 4,762,344 | A | 8/1988 | Perkins et al. | 285/175 |
| 4,799,544 | A | 1/1989 | Curlett | 166/65.1 |
| 4,822,081 | A | 4/1989 | Blose | 285/334 |
| 4,825,674 | A | 5/1989 | Tanaka et al. | 72/98 |
| 4,832,764 | A | 5/1989 | Merz | 148/330 |
| 4,836,278 | A | 6/1989 | Stone et al. | 166/115 |
| 4,838,349 | A | 6/1989 | Berzin | 166/187 |
| 4,838,961 | A | 6/1989 | Fukizawa et al. | 148/12.4 |
| 4,893,658 | A | 1/1990 | Kimura et al. | 138/109 |
| 4,917,738 | A | 4/1990 | Takano et al. | 148/325 |
| 4,921,045 | A | 5/1990 | Richardson | 166/134 |
| 4,924,949 | A | 5/1990 | Curlett | 175/25 |
| 4,986,658 | A | 1/1991 | Kim | 356/318 |
| 5,048,871 | A | 9/1991 | Pfeiffer et al. | 285/39 |
| 5,097,710 | A | 3/1992 | Palynchuk | 73/644 |
| 5,112,411 | A | 5/1992 | Greenfield | 148/528 |
| 5,174,340 | A | 12/1992 | Peterson et al. | 138/110 |
| 5,249,628 | A | 10/1993 | Surjaatmadja | 166/308 |
| RE34,467 | E | 12/1993 | Reeves | 285/334 |
| 5,288,347 | A | 2/1994 | Uehara et al. | 148/577 |
| 5,348,095 | A | 9/1994 | Worrall et al. | 166/380 |
| 5,361,836 | A | 11/1994 | Sorem et al. | 166/187 |
| 5,366,012 | A | 11/1994 | Lohbeck | 166/277 |
| 5,388,648 | A | 2/1995 | Jordan, Jr. | 166/380 |
| 5,411,301 | A | 5/1995 | Moyer et al. | 285/334 |
| 5,419,595 | A | 5/1995 | Yamamoto et al. | 285/334 |
| 5,567,335 | A | 10/1996 | Baessler | 219/61.2 |
| 5,667,011 | A | 9/1997 | Gill et al. | 166/295 |
| 5,672,217 | A | 9/1997 | Hengerer et al. | 148/589 |
| 5,829,797 | A | 11/1998 | Yamamoto et al. | 285/333 |
| 5,851,313 | A | 12/1998 | Milam | 148/222 |
| 5,901,789 | A | 5/1999 | Donnelly et al. | 166/381 |
| 5,911,842 | A | 6/1999 | Shiga et al. | 148/325 |
| 5,933,945 | A | 8/1999 | Thomeer et al. | 29/825 |
| 5,964,288 | A | 10/1999 | Leighton et al. | 166/207 |
| 5,984,568 | A | 11/1999 | Lohbeck | 403/375 |
| 6,009,611 | A | 1/2000 | Adams et al. | 29/407.01 |
| 6,012,522 | A | 1/2000 | Donnelly et al. | 166/276 |
| 6,024,181 | A | 2/2000 | Richardson et al. | 175/162 |
| 6,027,145 | A | 2/2000 | Tsuru et al. | 285/94 |
| 6,070,671 | A | 6/2000 | Cumming et al. | 166/381 |
| 6,073,332 | A | 6/2000 | Turner | 29/456 |
| 6,155,613 | A | 12/2000 | Quadflieg et al. | 285/334 |
| 6,158,785 | A | 12/2000 | Beaulier et al. | 285/334 |
| 6,159,312 | A | 12/2000 | Koo et al. | 148/336 |
| 6,217,676 | B1 | 4/2001 | Takabe et al. | 148/333 |
| 6,220,306 | B1 | 4/2001 | Omura et al. | 138/177 |
| 6,237,967 | B1 | 5/2001 | Yamamoto et al. | 285/333 |
| 6,248,187 | B1 | 6/2001 | Asahi et al. | 148/333 |
| 6,253,846 | B1 | 7/2001 | Nazzai et al. | 166/242.2 |
| 6,253,850 | B1 | 7/2001 | Nazzai et al. | 166/277 |
| 6,263,966 | B1 | 7/2001 | Haut et al. | 166/278 |
| 6,263,968 | B1 | 7/2001 | Freeman et al. | 166/313 |
| 6,263,972 | B1 | 7/2001 | Richard et al. | 166/381 |
| 6,267,828 | B1 | 7/2001 | Kushida et al. | 148/334 |
| 6,273,634 | B1 | 8/2001 | Lohbeck | 403/297 |
| 6,273,968 | B1 | 8/2001 | Thomas | 148/333 |
| 6,286,558 | B1 | 9/2001 | Quigley et al. | 138/125 |
| 6,311,792 | B1 | 11/2001 | Scott et al. | 175/162 |
| 6,315,040 | B1 | 11/2001 | Donnelly | 166/207 |
| 6,318,457 | B1 | 11/2001 | Den Boer et al. | 166/66.7 |
| 6,328,113 | B1 | 12/2001 | Cook | 166/387 |
| 6,334,351 | B1 | 1/2002 | Tsuchiya | 72/370.06 |
| 6,423,426 | B1 | 7/2002 | Kobayashi et al. | 428/659 |
| 6,443,247 | B1 | 9/2002 | Wardley | 175/402 |
| 6,447,025 | B1 | 9/2002 | Smith | 285/333 |
| 6,454,024 | B1 | 9/2002 | Nackerud | 175/57 |
| 6,464,804 | B2 | 10/2002 | Goecmen et al. | 148/325 |
| 6,554,287 | B1 | 4/2003 | Sivley, IV et al. | 277/616 |
| 6,557,906 | B1 | 5/2003 | Carcagno | 285/333 |
| 6,585,299 | B1 | 7/2003 | Quadflieg et al. | 285/333 |
| 6,609,735 | B1 | 8/2003 | DeLange et al. | 285/334 |
| 6,646,427 | B2 | 11/2003 | Trejo et al. | 324/71.1 |
| 6,659,509 | B2 | 12/2003 | Goto et al. | 285/333 |
| 6,709,534 | B2 | 3/2004 | Kusinski et al. | 148/320 |
| 6,746,548 | B2 | 6/2004 | Kusinski et al. | 148/320 |
| 7,169,239 | B2 | 1/2007 | Reavis et al. | 148/320 |
| 2003/0121558 | A1 | 7/2003 | Cook et al. | 166/380 |
| 2005/0015963 | A1 | 1/2005 | Costa et al. | 29/523 |
| 2005/0217768 | A1* | 10/2005 | Asahi et al. | 148/593 |

FOREIGN PATENT DOCUMENTS

| | | |
|---|---|---|
| JP | 565 949 | 1/1981 |
| JP | 5 625 925 | 3/1981 |
| JP | 58 213 825 A2 | 12/1983 |
| JP | 2 038 517 A2 | 2/1990 |
| JP | 7 188 734 A2 | 7/1995 |
| WO | 99/18328 | 4/1999 |
| WO | 2004/074622 | 9/2004 |

OTHER PUBLICATIONS

Kermani et al. "In-Field Corrosion Performance of 3% Cr Steels in Sweet and Sour Downhole Production and Water Injection" Corrosion 2004 Paper No. 04111 (pp. 1-18).

Gonzalez et al. "Less is more when fighting corrosion" Hart's E&P www.EandPnet.com (1 page).

Haberer "New Solutions May Ease Hardbanding Controversy," Drilling Contractor Sep./Oct. 2000 (2 pages).

Haberer "Viable Drill Pipe Hardbanding Strategies are Outlined," Drilling Contractor Nov./Dec. 2000 (2 pages).

KSBear Premium Connection, JFE Steel Corporation http://www.jfe-steel.co.jp/en/products/pipes/octg/pdf/KSBear.pdf (8 pages).

U.S. Appl. No. 10/382,625, filed Mar. 6, 2003 by Leland M. Brill et al., and entitled "Tubular Goods with Expandable Threaded Connections".

"Solid Expandables—Revolutionary Metal-to-Metal Solid Expandable Systems for Wellbore Enhancement and Increased Productivity" Weatherford International (pp. 1-19).

American Petroleum Institute "Specification for Threading, Gauging, and Thread Inspection of Casing, Tubing, and Line Pipe Threads (U.S. Customary Units)," API Specification Standard 5B, Fourteenth Edition (30 pages).

Rigzone "Tesco Provides Casing Drilling Operations Update" http://www.rigzone.com/news/article.asp?a_id=1755 (2 pages).

Rigzone "Conoco and Tesco Unveil Revolutionary Drilling Rig" http://www.rigzone.com/news/article.asp?a_id=2603 (2 pages).

Tesco Corporation "Casing Drilling™ Process" http://www.tescocorp.com/htmls/casing_drilling.html (4 pages).

Flatern "Oilfield Service Trio Target Jules Verne Territory," http://www.oilonline.com/new/features/oe/20010817.oilfield.7127.asp (9 pages).

Harris "Tube Welding," http://www.tubenet.org.uk/technical/ewi.html (6 pages).

* cited by examiner

SOLID EXPANDABLE TUBULAR MEMBERS FORMED FROM VERY LOW CARBON STEEL AND METHOD

RELATED APPLICATIONS

This application is a divisional of U.S. application Ser. No. 10/440,065, filed May 16, 2003 now U.S. Pat. No. 7,169,239, the entire contents of which are incorporated herein in their entirety by reference.

TECHNICAL FIELD

The present invention is related in general to materials and methods used to form expandable tubular members and in particular steel alloys and methods for producing oil country tubular goods which may be radially expanded within a wellbore.

BACKGROUND OF THE INVENTION

Wellbores for producing oil, gas or other fluids from subsurface formations are often drilled in stages. For example, a wellbore may first be drilled with a drill string and a first drill bit having a relatively large diameter. At a desired depth for a first portion of the wellbore, the drill string and drill bit are removed from the wellbore. A tubular member of smaller diameter, often referred to as a casing or a casing string, may then be placed in the first portion of the wellbore. An annulus formed between the inside diameter of the wellbore and the outside diameter of the casing string is generally filled with cement. The cement provides support for the casing and isolates downhole formations or subterranean strata from each other. Many oil and gas wells are completed with a relatively large diameter casing at the well surface and a smaller diameter casing extending from the large diameter casing in a telescoping or stair step pattern from the well surface to a desired downhole location. One or more strings of production tubing along with appropriate well completion tools may be installed within the casing strings for use in producing formation fluids from one or more downhole locations.

For very deep wells and very long wells, sometimes referred to as extended reach wells (20,000 feet or greater), there may be three or four changes in casing diameter from the well surface to total depth of the wellbore. Each change in casing diameter often results in decreasing the diameter of production tubing used to produce formation fluids from a desired downhole location. Changes in casing diameter associated with deep wells and/or long wells result in significantly increased drilling and completion costs for associated wells.

Steel, an alloy of iron, is typically made by oxidizing excess carbon and other impurities from molten pig iron. Steel alloys may be produced by injecting substantially pure oxygen into molten iron. Steel alloys may also be produced in electric furnaces which use iron ore as a source of oxygen to remove excess carbon.

Steel alloys typically include relatively high percentages of iron (Fe) and one or more nonmetallic elements. Carbon (C) is one of the most common nonmetallic elements associate with steel alloys. One or more metal elements in addition to iron may be included in many steel alloys. For example, some steel alloys may contain chromium (Cr) and nickel (Ni). Such alloys may sometimes be referred to as "stainless steel." Oil country tubular goods are frequently formed from steel alloys which have been quenched and tempered to produce desired characteristics such as yield strength and ductility. Such steel alloys often have 90% to 95% or greater tempered martensite by volume of the steel alloy.

Martensite may generally be described as a solid solution of iron which typically contains one percent or less of carbon. Martensite is often a chief constituent of hardened carbon tool steels. Martensite may be formed by heating steel alloys and then quenching them in cold water. Martensite is sometimes difficult to obtain during quenching of low carbon steel alloys and very low carbon steel alloys. A wide variety of commercial techniques and procedures have been developed for use in satisfactorily quenching low carbon steel allows and very low carbon steel alloys with desired martensite concentrations.

A number of oil and gas wells have been completed using solid, expandable casings and other types of solid, expandable tubular members. Electric resistant welded (ERW) pipe has been used to form such casings. Examples of steel alloys and steel compositions which have previously been used to manufacture solid, expandable casings include quenched and tempered steel alloys with carbon concentrations between approximately 0.22% and 0.25%. The yield strength of such steel alloys may range between approximately 70,000 and 80,000 pounds per square inch with an upper limit of approximately 95,000 pounds per square inch. Casing formed from such steel alloys may be radially expanded up to approximately twenty-five percent (25%) within a wellbore. Average radial expansion for casing formed from such steel alloys may be approximately fifteen percent (15%).

SUMMARY OF THE INVENTION

In accordance with teachings of the present invention, very low carbon steel alloys are provided for use in manufacturing solid, expandable tubular members. One aspect of the present invention includes providing threaded and coupled tubular members which may be releasably engaged with each other to accommodate radial expansion of the tubular members at a downhole location during completion of a wellbore. Another aspect of the present invention includes providing tubular members with threaded swaged ends which may be releasably engaged with each other to accommodate radial expansion of the tubular members at a downhole location during completion of a wellbore.

Technical benefits of the present invention include providing steel alloys with very low carbon concentrations satisfactory for use in forming solid, expandable tubular members which may be radially expanded from approximately twenty percent (20%) to forty-five percent (45%) or greater. After such radial expansion, the tubular members may still provide required mechanical strength and fluid tight integrity for satisfactory completion of a wellbore and production of formation fluids.

Further technical benefits of the present invention include providing solid, expandable tubular member formed from very low carbon steel alloys that substantially reduce or eliminate requirements for telescoping or tapering of wellbores from an associated well surface to a desired downhole location. Such tubular members preferably maintain both desired mechanical strength and fluid tight integrity during radial expansion within a wellbore. Expandable tubular members formed in accordance with teachings of the present invention may allow wells to be completed to relatively deep geological locations or at extended distances from a production platform which may have been difficult and/or expensive to reach using traditional well drilling and casing technology. The use of such solid, expandable tubular members may allow wellbores to be drilled and completed with only one or two sizes of casing extending from a well surface to a relatively deep downhole location and/or extended reach location. As a result of requiring only one or two sizes of casing to complete a wellbore, surface equipment, associated drilling rigs, drill strings, drill bit sizes and downhole well completion equipment may be standardized to significantly reduce costs.

For some applications tubular members formed in accordance with teachings of the present invention may be radially expanded by as much as twenty percent (20%) to forty five percent (45%) of their original inside diameter and satisfactorily hold as much as three thousand five hundred pounds per square inch (3,500 psi) of internal fluid pressure after such radial expansion. Tubular members formed from only low carbon steel alloys in accordance with teachings of the present invention provide required mechanical strength to complete deep and/or extended reach wellbores and provide required fluid pressure tight seals between the interior and the exterior of associated tubular members.

Quench and temper procedures are often limited to use with high carbon steel alloys and medium carbon steel alloys. Quenching and tempering very low carbon steel alloys is a relatively unusual procedure. Normalizing is a more common technique associated with very low carbon steel alloys. Quenching and tempering very low carbon steel alloys formed in accordance with teachings of the present invention may result in relatively high ductility appropriate for radial expansion of resulting tubular members in the range of approximately twenty percent to forty-five percent. Quenching and tempering very low carbon steel alloys formed in accordance with teachings of the present invention typically produces relatively fine grain structures and relatively high yield strengths associated with oil country tubular goods. Quenching and tempering very low carbon steel alloys formed in accordance with teachings of the present invention results in higher yield strength as compared with normalizing the same very low carbon steel alloys. Fracture toughness of the resulting tubular members may also be increased.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
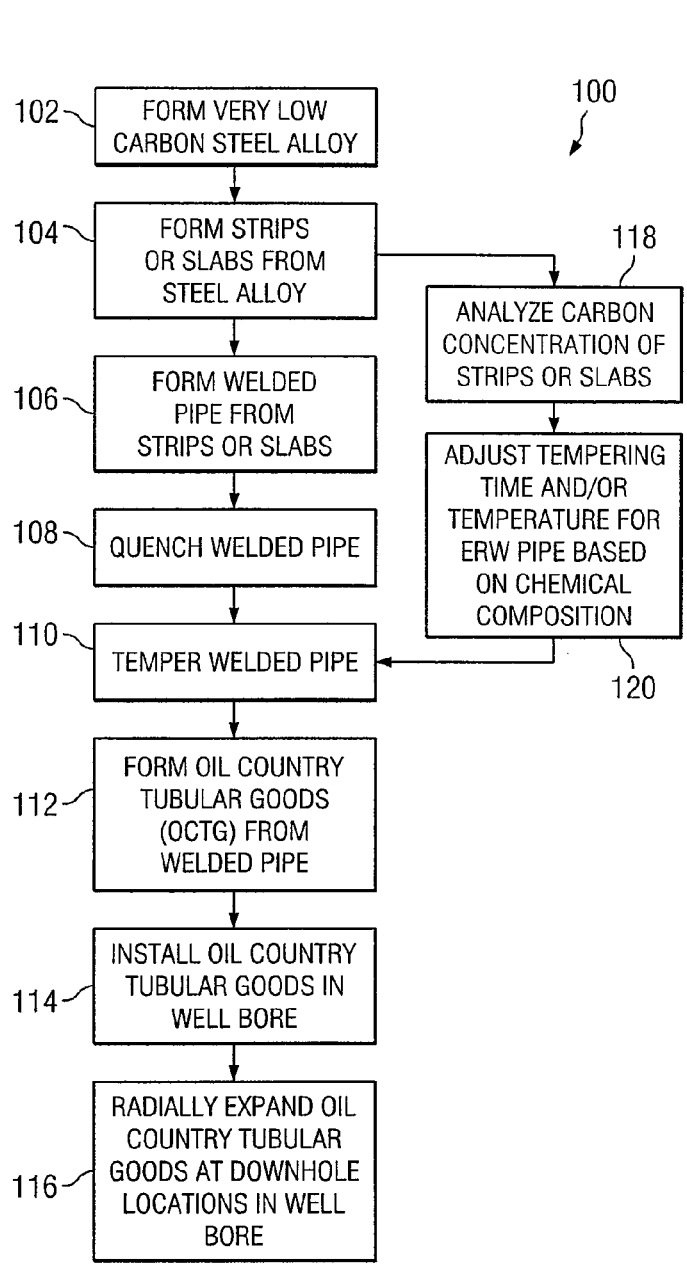
FIG. 1 is a block diagram showing one example of a method which may be used to form solid, expandable tubular members from very low carbon steel alloys in accordance with teachings of the present invention and radially expand such tubular members.

Preferred embodiments of the invention and its advantages are best understood by reference to FIGS. 1-6 wherein like numbers refer to same and like parts.

The term "very low carbon steel alloys" may be used in the steel industry to describe steel alloys with a concentration of carbon between approximately 0.001% and 0.1% by weight of the steel alloy. Low carbon steel alloys or mild steel often contains between approximately 0.1% and 0.3% carbon. Medium carbon steel alloys may contain between approximately 0.3% and 0.7% carbon. High carbon steel alloys may contain between approximately 0.7% and 1.5% carbon.

Very low carbon steel alloys formed in accordance with teachings of the present invention preferably have carbon concentrations of between approximately 0.03% and 0.06% by weight of the steel alloy. Such very low carbon steel alloys may also have at least ninety percent (90%) iron by weight of the steel alloy and at least ninety (90%) martensite by volume of the steel alloy. Often the concentration of iron will be 95% or greater by weight of the very low carbon steel alloy.

The terms "oil country tubular goods" and "OCTG" are used in this application to include casing, tubing, pup joints, couplings and any other type of pipe or tubular member associated with drilling, producing or servicing oil wells, natural gas wells, geothermal wells or any other subsurface wellbore.

The terms "welded pipe" and "welded tubular goods" are used in this application to include any pipe, tubular member or coupling manufactured from rolled steel or steel strips which were passed through forming rollers to create a longitudinal butt joint and welded along the longitudinal butt joint. The resulting longitudinal butt weld or longitudinal seam weld may be formed using various techniques such as electric resistance welding (ERW), arc welding, laser welding, high frequency induction welding and any other techniques satisfactory for producing longitudinal seam welds. Welded pipe and welded tubular goods may be produced in individual links or may be produced in continuous links from coiled skelp and subsequently cut into individual links.

The terms "tubular member" and "tubular members" are used in this application to include oil country tubular goods and accessory equipment such as liner hangers, casing nipples, landing nipples and cross connects associated with completion of oil and gas wells. The terms "tubular member" and "tubular members" are also used in this application to include any pipe of any size or any description and is not limited to only tubular members associated with oil and gas wells.

Various aspects of the present invention will be described with respect to tubular members including couplings which have been formed using electric resistant welding (ERW) technology. However, the present invention is not limited to use with tubular members produced by ERW technology. A wide variety of tubular members including oil country tubular goods (OCTG) may be formed from very low carbon steel alloys incorporating teachings of the present invention using a wide variety of welding techniques.

ERW technology often allows increased quality control of wall thickness of associated welded pipe and minimizes material defects. Tubular members formed in accordance with teachings of the present invention from ERW pipe may have better performance characteristics, such as mechanical strength and fluid tight integrity after radial expansion as compared with conventional oil country tubular goods formed from seamless pipe.

FIG. 1 is a block diagram showing one example of a method which may be used to form various types of tubular members including, but not limited to, oil country tubular goods from very low carbon steel alloys incorporating teachings of the present invention and radially expanding the resulting tubular members. Method 100 starts at step 102 by forming a very low carbon steel alloys.

For some applications very low carbon steel alloys may be produced in an electric furnace (not expressly shown). Also, very low carbon steel alloys may be produced by injecting substantially pure oxygen into molten iron using commercially available equipment and techniques. Other commercially available techniques associated with manufacturing steel alloys may also be satisfactorily used to produce very low carbon steel alloys incorporating teachings of the present invention. Table A shows some examples of a very low carbon steel alloy formed in accordance with teachings of the present invention.

TABLE A

Very Low Carbon Steel Alloys

|  | Optimum (1) | Acceptable Range of Concentration (1) | |
| --- | --- | --- | --- |
|  | Concentration | Minimum | Maximum |
| Carbon (C) | 0.045% | 0.03% | 0.06% |
| Manganese (Mn) | 1.45% | 1.40% | 1.50% |
| Phosphorus (P) |  |  | 0.015% |
| Sulfur (S) |  |  | 0.005% |
| Silicon (Si) | 0.23% | 0.15% | 0.30% |
| Copper (Cu) |  |  | 0.10% |
| Nickel (Ni) |  |  | 0.10% |
| Chromium (Cr) |  |  | 0.10% |
| Molybdenum (Mo) |  |  | 0.06% |
| Vanadium (V) | 0.065% | 0.05% | 0.08% |
| Tin (Sn) |  |  | 0.01% |
| Aluminum (Al) | 0.025% | 0.015% | 0.040% |
| Calcium (Ca) | 0.0020% | 0.0005% | 0.0055% |
| Columbium (Cb) or Niobium (Nb) | 0.040% | 0.030% | 0.050% |
| Boron (B) | Res |  | 0.0005% Max |
| Titanium (Ti) |  |  |  |
| Nitrogen (N) |  |  | 0.010% Max |

NOTES:
1. Percentages based on weight of steel alloy.
2. Total concentration of V + Nb + Ti limited to 0.15% maximum.
3. Liquidus temperature approximately 2770° F.

At step 104 strips or slabs may be formed from the very low carbon steel alloys using conventional steel fabrication equipment and techniques (not expressly shown).

At step 106 welded pipe may be formed from the steel strips or steel slabs using various techniques including, but not limited to, using electric resistance welding. The resulting welded pipe may then be quenched at step 108 to produce at least 90% martensite by volume of the associated steel alloy. For some applications a high volume water quench may be used. U.S. Pat. Nos. 4,417,928 and 4,502,699 show one example of equipment which may be used to quench welded pipe.

Figure 2:
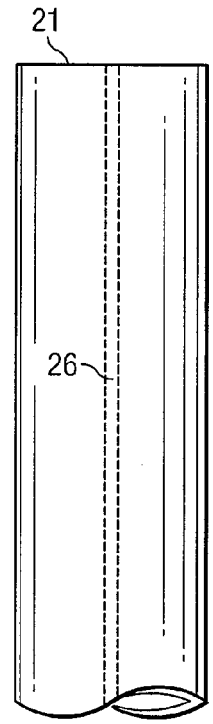
FIG. 2 is a schematic drawing in elevation with portions broken away showing an electric resistance welded pipe formed from very low carbon steel alloys in accordance with teachings of the present invention.
Figure 2:
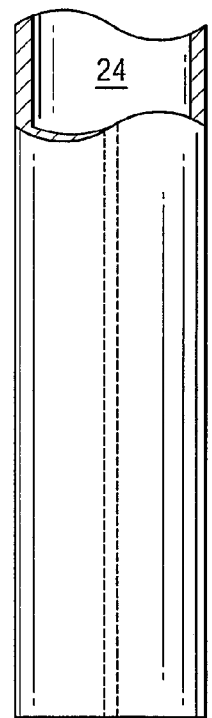

At step 110 the welded pipe may be tempered to produce desired yield strength and ductility. An example of welded pipe which has been formed from very low carbon steel and quenched and tempered in accordance with teachings of the present invention is shown in FIG. 2.

At step 118 samples may be taken from the steel strips or slabs and analyzed to determine the specific chemical composition the respective very low carbon steel alloy. At step 120 tempering time and/or tempering temperature for the welded pipe produced in steps 106 and 108 may be modified based on that chemical composition.

A wide variety of procedures and equipment may be satisfactorily used to quench welded pipe at step 108 and temper the welded pipe at step 110. Specific quench and temper procedures will vary depending upon the type of equipment and manufacturing techniques available at each steel fabrication facility (not expressly shown). Typically, one or more computer programs may be empirically derived for each steel fabrication facility to control associated quench and temper procedures. Quenching and tempering very low carbon steel alloys at steps 108 and 110 results in forming welded pipe with high ductility or high elongation capabilities, increased toughness with respect to fracture and yield strengths satisfactory for use as oil country tubular goods.

Depending upon dimensions such as length, outside diameter and inside diameter, welded pipe formed from very low carbon steel alloys may be rapidly quenched using cold water from a temperature of 1650 to 1600° F. to a temperature of 100° F. Based on the chemical composition including concentration of carbon in the very low carbon steel alloy, steps 118 and 120 may result in a tempering at temperatures of approximately 1200° F. to 1250° F. for approximately 40 minutes to 55 minutes. For very low carbon steel alloys with a carbon concentration of approximately 0.045% by weight of this steel alloy, tempering may be conducted at approximately 1230° F. for approximately 50 minutes.

Figure 5:
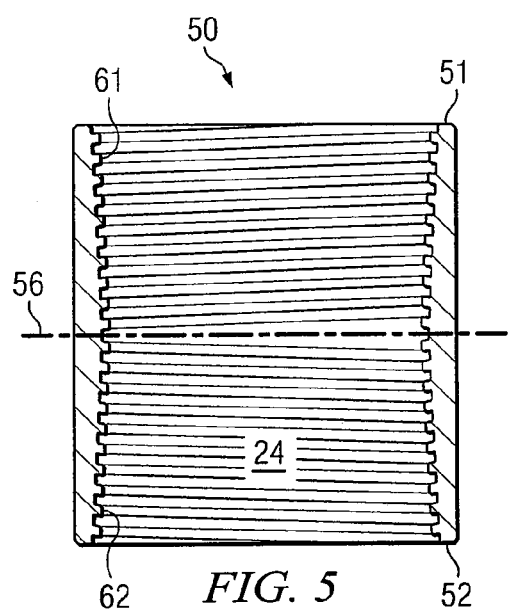
FIG. 5 is a schematic drawing in section showing a coupling formed from very low carbon steel alloys in accordance with teachings of the present invention.

At step 112 various types of oil country tubular goods may be formed from the welded pipe. Examples of such tubular goods include casing 30 shown in FIG. 3, coupling 50 such as shown in FIG. 5, and casing 130 shown in FIG. 6.

At step 114 the resulting oil country tubular goods may be installed within a wellbore (not expressly shown) using well completion equipment (not expressly shown) and techniques associated solid, expandable OCTG.

At step 116 the oil country tubular goods may be radially expanded approximately 20% to 45% or greater downhole in the wellbore depending upon overall design of the associated well completion. Such radial expansion is typically measured by changes in the inside diameter of the oil country tubular goods. Radial expansion may sometimes be conducted in increments such as a first radial expansion of approximately fourteen or fifteen percent. Second and possibly third radial expansions of approximately fourteen or fifteen percent may also be performed depending upon the associated well completion.

Figure 3:
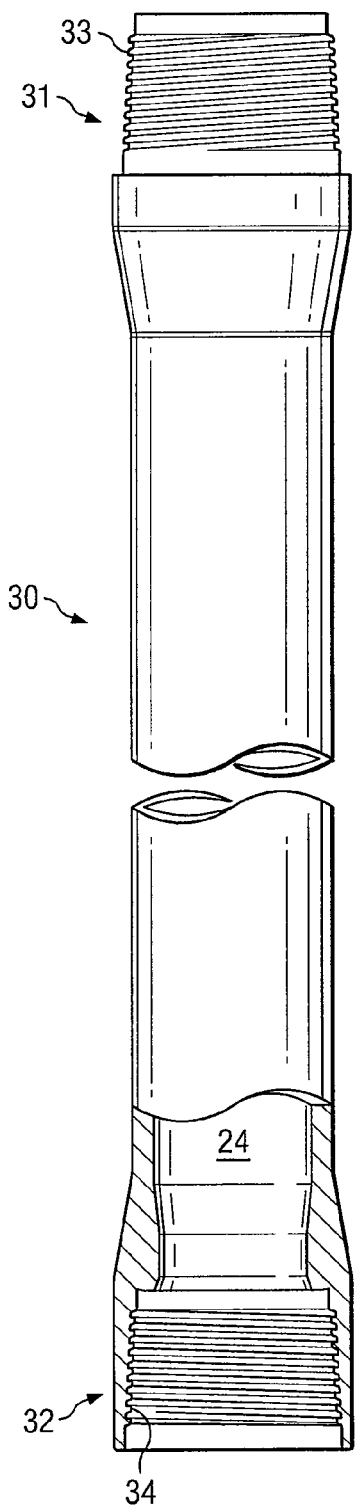
FIG. 3 is a schematic drawing in section and in elevation with portions broken away of a tubular member formed from very low carbon steel alloys in accordance with teachings of the present invention having a first, pin end and a second, box end.
Figure 6:
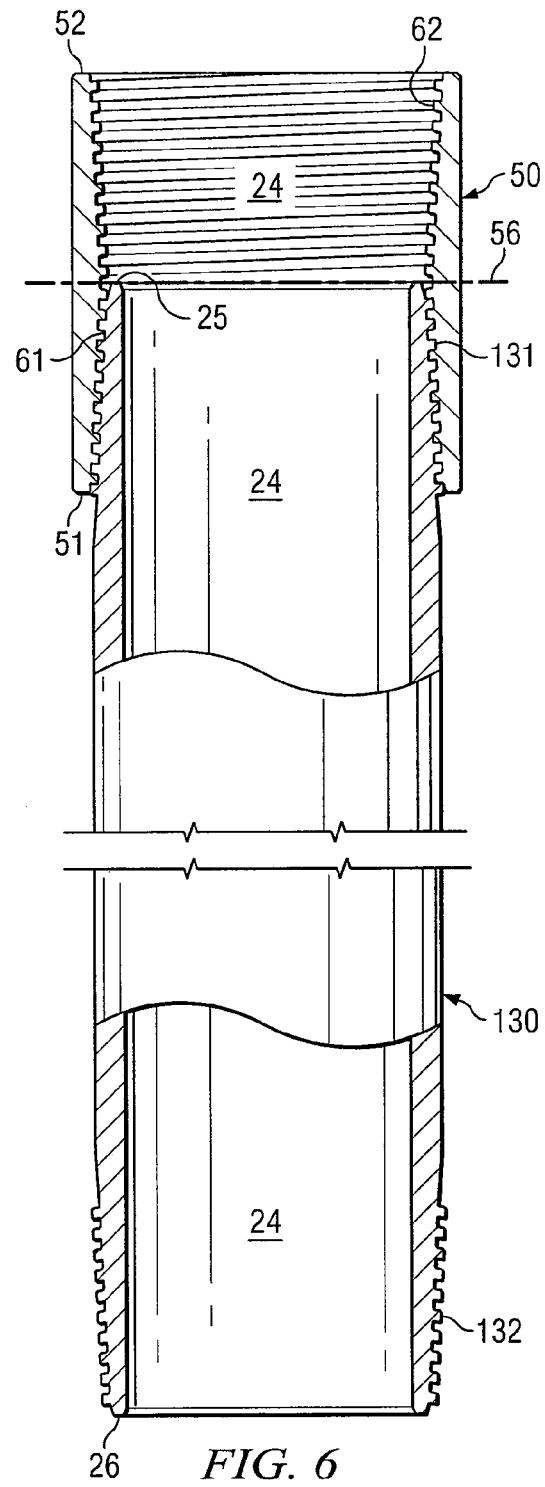
FIG. 6 is a schematic drawing in section and in elevation with portions broken away showing the coupling of FIG. 5 engaged with a tubular member formed from very low carbon steel alloys in accordance with teachings of the present invention.

Welded pipe 20 formed from a very low carbon steel alloy incorporating teachings of the present invention is shown in FIG. 2. Welded pipe 20 preferably includes first end 21, second end 22 with longitudinal bore 24 extending therethrough. As discussed later in more detail, welded pipe 20 may be used to form tubular member 30 as shown in FIG. 3, coupling 50 as shown in FIG. 5 and/or tubular member 130 as shown in FIG. 6. The length of welded pipe 20 may be substantially varied depending upon the type of equipment and manufacturing procedures available at each steel fabrication facility. Quenching and tempering procedures at steps 108 and 110 may be varied depending upon chemical composition and length, outside diameter and inside diameter of welded pipe 20.

Figure 4:
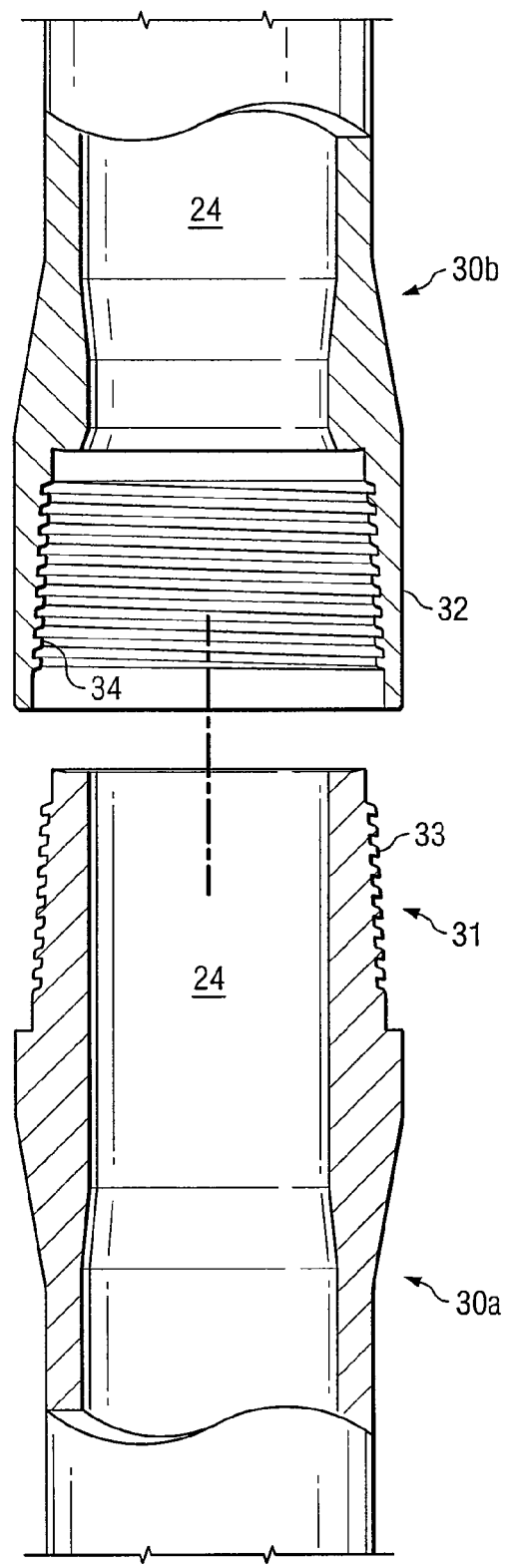
FIG. 4 is a schematic drawing in elevation and in section with portions broken away showing a first tubular member and a second tubular member formed from very low carbon steel alloys in accordance with teachings of the present invention.

Various aspects of the present invention will be discussed with respect to tubular members 30 as shown in FIGS. 3 and 4. To describe some features of the present invention, tubular members 30 may sometimes be designated as 30a and 30b.

For some applications, each tubular member 30 may be a section or joint of a casing string used to complete a wellbore (not expressly shown). For such applications, each tubular member 30 may have overall dimensions and configurations compatible with a conventional oil field casing.

FIG. 3 shows tubular member 30 which may be formed with welded pipe 20. For this embodiment, tubular member 30 may be generally described as an elongated, hollow section of casing. Tubular member 30 preferably includes first pin end 31 and second box end 32 with longitudinal bore 24 extending therethrough. Pin end 31 and box end 32 may be formed on respective first end 21 and second end 22 of welded pipe 20 by conventional "swagging" techniques associated with manufacture of oil country tubular goods.

Threaded portions 33 and 34 may be formed on respective pin end 31 and box end 32 of tubular member 130. Threaded portion 33 and threaded portion 34 may have thread forms or thread profiles similar to American Petroleum Institute (API) buttress threads for oil country tubular goods. API Specification Standard 5B contains information for various types of threads associated with OCTG. Also, various types of premium threads associated with oil country tubular goods may be formed on threaded portions 33 and 34. Threaded portions 33 and 34 may sometimes be generally described as modified buttress threads.

For many conventional well completions casing and production tubing are typically installed in a wellbore with the box end of tubular members facing upwards. Most well completion equipment and procedures are based upon lowering the pin end of a tubular member into engagement with a box end which is facing upward at the well surface. During completion of a wellbore with solid expandable casing such as tubular members 30, it may be preferable to have pin end 31 of tubular member 30a facing upward for engagement with box end 32 of tubular member 30b.

Swaged connections such as pin end 31 and box end 32 may provide improved fluid sealing characteristics during radial expansion of the associated tubular member within a wellbore. Various types of well completion equipment and techniques may be satisfactorily used to install tubular members 30 within a wellbore and to radially expand the tubular members. Depending upon each specific well completion and the type of radial expansion equipment used to complete each wellbore, there may be substantial benefits from the perspective of mechanical strength and/or maintaining fluid tight integrity to use swaged connections such as pin end 31 and box end 32.

As previously noted, welded pipe 20 as shown in FIG. 2 may be used to form various types of tubular members including couplings 50 as shown in FIGS. 5 and 6. The number of couplings formed from welded pipe 20 will depend on the length of welded pipe 20 and the desired length of each coupling 50. For the embodiment of the present invention as shown in FIGS. 5 and 6 coupling 50 preferably includes first end 51 and second end 52. Various types of modified buttress threads and/or other thread profiles may be formed within longitudinal bore 24 of coupling 50. For the embodiment shown in FIG. 5 coupling 50 preferably includes threaded portions 61 and 62 which may be generally symmetrically formed relative to center plane 56 of coupling 50.

Tubular member or casing 130 as shown in FIG. 6 may also be formed from welded pipe 20. Tubular member 130 preferably includes first pin end 131 and second pin end 132 with longitudinal bore 24 extending there through. First pin end 131 and second pin end 132 may be formed on respective first end 21 and second end 22 of welded pipe 20 using conventional threading techniques associated with manufacture of oil country tubular goods. Threaded portions 133 and 134 may be formed on respective first pin end 131 and second pin end 132 of tubular member 130. Threaded portion 133 and threaded portion 134 preferably have thread forms or thread profiles compatible with threaded portion 61 and 62 of casing 50.

For some applications tubular member 130 and associated couplings 50 may be formed at a oil country tubular good manufacturing facility (not expressly shown) and engaged with each other as shown in FIG. 6. The associated casing section or joint (tubular member 130 and coupling 50) may then be shipped as a unit to a well site for installation within a wellbore and radial expansion as previously discussed.

Although the present invention and its advantages have been described in detail, it should be understood that various changes, substitutions and alternations can be made herein without departing from the spirit and scope of the invention as defined by the following claims.

What is claimed is:

1. A tubular member comprising:
   a welded pipe formed from a very low carbon steel alloy having iron at a concentration of at least ninety-five percent by weight of the steel alloy, chromium at a concentration of less than approximately 0.1% by weight of the steel alloy, and carbon at a concentration of between approximately 0.03% and 0.06% by weight of the steel alloy;
   the steel alloy quenched to produce a concentration of martensite of at least ninety percent by volume of the steel alloy;
   the steel alloy tempered to produce desired ductility and strength to accommodate radial expansion of the tubular member between approximately twenty percent and forty-five percent;
   a pin end and a box end formed on the pipe with a longitudinal bore extending through the pipe from the pin end to the box end;
   an external threaded portion formed on the pin end and an internal threaded portion formed within the box end; and
   the external threaded portion and the internal threaded portion operable to be releasably engaged with other respective internal and external threaded portions of other tubular members.

2. The tubular member of claim 1 further comprising an inside diameter operable to be radially expanded at least approximately twenty percent to forty-five percent of the original inside diameter.

3. The tubular member of claim 1 wherein the steel alloy further comprises a total concentration of vanadium, niobium and titanium limited to less than approximately 0.15% by weight of the steel alloy.

4. The tubular member of claim 1 further comprising the external threaded portion and the internal threaded portion having matching modified buttress thread forms.

5. A solid, expandable casing string for using in completing a wellbore comprising:
   a first tubular member formed from an electric resistance welded pipe;
   a second tubular member formed from an electric resistant welded pipe;
   the electric resistance pipes formed from a steel alloy (a) having carbon at a concentration of between approximately 0.03% and 0.06% by weight of the steel alloy and (b) tempered to produce desired ductility and strength to accommodate radial expansion of the tubular member between approximately twenty percent and forty-five percent;

the first tubular member having a pin end and a box end with a longitudinal bore extending through the first tubular member between the pin end and the box end;

a first threaded portion formed on the pin end of the first tubular member and a second threaded portion formed in the box end of the first tubular member;

the second tubular member having a pin end and a box end with a longitudinal bore extending through the second tubular member between the pin end and the box end;

a first threaded portion formed on the pin end of each tubular member and a second threaded portion formed in the box end of each tubular member; and the first threaded portion of the pin end of the first tubular member releasably engaged with the second threaded portion of the box end of the second tubular member.

6. The casing string of claim 5 further comprising:

the steel alloy having low concentrations of vanadium, niobium and titanium; and the total concentration of vanadium, niobium and titanium less than approximately 0.15% by weight of the steel alloy.

7. A solid, expandable casing string for using in completing a wellbore comprising:

a first tubular member formed from an electric resistance welded pipe;

a second tubular member formed from an electric resistant welded pipe;

the electric resistance welded pipes formed from a steel alloy (a) having carbon at a concentration of between approximately 0.03% and 0.06% by weight of the steel alloy and (b) tempered to produce desired ductility and strength to accommodate radial expansion of the tubular member between approximately twenty percent and forty-five percent;

the first tubular member having a first end and a second end with a longitudinal bore extending through the first tubular member between the first end and the second end;

the second tubular member having a first end and a second end with a longitudinal bore extending through the second tubular member between the first end and the second end; and the first end of the first tubular member releasably engaged with the second end of the second tubular member.

8. The casing string of claim 7 further wherein the steel alloy further comprises;

low concentrations of vanadium, niobium and titanium; and the total concentration of vanadium, niobium and titanium less than approximately 0.15% by weight of the steel alloy.

9. A solid, expandable coupling having high ductility satisfactory for completing a wellbore comprising:

a first end and a second end with a longitudinal bore extending through the coupling between the first end and the second end;

the coupling formed from a steel alloy;

the steel alloy (a) having carbon at a concentration of between approximately 0.03% and 0.06% by weight of the steel alloy and (b) tempered to produce desired ductility and strength to accommodate radial expansion of the tubular member between approximately twenty percent and forty-five percent;

a first threaded portion formed within the longitudinal bore of the coupling; and a second threaded portion formed within the longitudinal bore of the coupling.

10. The coupling of claim 9 wherein the steel alloy further comprises:

low concentrations of vanadium, niobium and titanium; and the total concentration of vanadium, niobium and titanium less than approximately 0.15% by weight of the steel alloy.

* * * * *